United States Patent
Ide et al.

(10) Patent No.: US 10,167,853 B2
(45) Date of Patent: Jan. 1, 2019

(54) METHOD FOR DETECTING DAMAGE OF WIND TURBINE BLADE AND WIND TURBINE

(71) Applicant: MITSUBISHI HEAVY INDUSTRIES, LTD., Minato-ku, Tokyo (JP)

(72) Inventors: Kazunari Ide, Tokyo (JP); Katsuhiko Takita, Tokyo (JP); Takao Kuroiwa, Tokyo (JP); Mitsuya Baba, Tokyo (JP); Hiroshi Nishino, Tokyo (JP); Takuya Koyanagi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 452 days.

(21) Appl. No.: 14/809,916

(22) Filed: Jul. 27, 2015

(65) Prior Publication Data
US 2016/0245262 A1 Aug. 25, 2016

(30) Foreign Application Priority Data
Feb. 24, 2015 (JP) .................................. 2015-033849

(51) Int. Cl.
*F03D 17/00* (2016.01)
*G01M 11/08* (2006.01)

(52) U.S. Cl.
CPC ........... *F03D 17/00* (2016.05); *G01M 11/085* (2013.01); *F05B 2270/326* (2013.01);
(Continued)

(58) Field of Classification Search
CPC ...... F03D 17/00; F03D 80/00; G01M 11/085; F05D 270/804
(Continued)

(56) References Cited

U.S. PATENT DOCUMENTS 8,310,657 B2 * 11/2012 Olesen ................. G01M 11/083
290/44
8,885,168 B2 * 11/2014 Olesen ................ F03D 11/0091
356/445
(Continued)

FOREIGN PATENT DOCUMENTS

EP 2589943 A1 5/2013
GB 2487072 A 7/2012
(Continued)

OTHER PUBLICATIONS

Europe Patent Office, "Search Report for EP 15177531.9," dated Nov. 4, 2015.
(Continued)

*Primary Examiner* — Jason Shanske
*Assistant Examiner* — Michael Sehn
(74) *Attorney, Agent, or Firm* — Manabu Kanesaka; Benjamin Hauptman; Kenneth Berner

(57) ABSTRACT

A method for detecting damage of a wind turbine blade of a wind turbine rotor having at least one wind turbine blade comprises: a light incident step of allowing light to enter an optical fiber sensor being mounted on each of the wind turbine blade and having a diffraction grating part having a refractive index which is periodically varied in a longitudinal direction of the diffraction grating part; a light detection step of detecting reflected light from the diffraction grating part; an obtaining step of obtaining, from a temporal change of a wavelength of the reflected light received in the light receiving step, a wavelength variation index representing a variation amount of the wavelength; and a damage determination step of determining presence or absence of a damage of the wind turbine blade on the basis of the wavelength variation index calculated in the obtaining step.

11 Claims, 8 Drawing Sheets

(52) U.S. Cl.
CPC ... *F05B 2270/803* (2013.01); *F05B 2270/804* (2013.01); *Y02E 10/721* (2013.01)

(58) Field of Classification Search
USPC .......................................................... 416/61
See application file for complete search history.

(56) References Cited

U.S. PATENT DOCUMENTS

| | | | |
|---|---|---|---|
| 2010/0054941 A1* | 3/2010 | Hoffmann | F03D 7/0204 416/61 |
| 2011/0215577 A1* | 9/2011 | Martin Da Silva | F03D 7/028 290/44 |
| 2012/0035865 A1 | 2/2012 | Fujioka et al. | |
| 2012/0116598 A1 | 5/2012 | Olesen | |
| 2014/0054894 A1 | 2/2014 | Olesen | |

FOREIGN PATENT DOCUMENTS

| | | |
|---|---|---|
| JP | S54-159274 A | 12/1979 |
| JP | S63-159677 A | 7/1988 |
| JP | H06-307921 A | 11/1994 |
| JP | 2004-045418 A | 2/2004 |
| JP | 2004-301030 A | 10/2004 |
| JP | 2005-325742 A | 11/2005 |
| WO | 2010/122658 A1 | 10/2010 |
| WO | 2014/024303 A1 | 2/2014 |

OTHER PUBLICATIONS

Wernicke, J. et al., "Production Integration of Fiber Optical Sensors Embedded in New Rotor Blades for Real Time Loads Feedback," Paper presented at the European Wind Energy Conference, 2007, p. 1-6, Milan, Italy.

Japan Patent Office, "Office Action for Japanese Patent Application No. 2015-033849," dated Jun. 21, 2017.

* cited by examiner

METHOD FOR DETECTING DAMAGE OF WIND TURBINE BLADE AND WIND TURBINE

RELATED APPLICATIONS

The present application is based on, and claims priority from, Japanese Application No. JP2015-033849 filed Feb. 24, 2015, the disclosure of which is hereby incorporated by reference herein in its entirety.

TECHNICAL FIELD

The present invention relates to a method for detecting damage of a wind turbine blade and a wind turbine.

BACKGROUND

Detecting a damage of a wind turbine blade on the basis of strain arising in the wind turbine, is known.

For example, Patent Document 1 discloses an apparatus to detect a strain of each of a plurality of wind turbines by means of a strain gauge mounted on each of the wind turbines and to monitor abnormality of the wind turbine blades by using the detection results.

In this apparatus, the output of the strain gauge for each blade is converted into an electric signal proportional to the stress level, and as to a component representing a magnitude of variation of the stress, difference between two of the blades is calculated. Then, it is determined that there is an abnormality in any of the wind turbines when the calculated difference between the two of the blades excesses a prescribed value over a prescribed length of time period.

CITATION LIST

Patent Literature

Patent Document 1: JP Sho63-159677 A

SUMMARY

Technical Problem

In some cases with strain gauges, the average of the output varies (drifts) with time due to e.g. self-heating during passage of a current. For this reason, strain gauges may be insufficient in reliability of measurement over a long period of time.

On the other hand, it is also known that a strain is measured by using an optical fiber sensor. However, in the measurement of a strain by means of an optical fiber sensor, a measurement error may actually be caused with a change in the outside air temperature. Such a measurement error may have effect on accuracy of damage detection based on a measurement of a strain by using an optical fiber sensor.

In view of the above circumstances, at least one embodiment of the present invention is to provide a method for detecting damage of a wind turbine blade with a good accuracy even under an environment where temperature changes.

Solution to Problem (1) A method for detecting damage of a wind turbine blade according to at least one embodiment of the present invention is a method for detecting damage of a wind turbine blade of a wind turbine rotor having at least one wind turbine blade, comprising:

a light incident step of allowing light to enter an optical fiber sensor being mounted on each of the wind turbine blade and having a diffraction grating part having a refractive index which is periodically varied in a longitudinal direction of the diffraction grating part;

a light detection step of detecting reflected light from the diffraction grating part;

an obtaining step of obtaining, from a temporal change of a wavelength of the reflected light received in the light receiving step, a wavelength variation index representing a variation amount of the wavelength; and a damage determination step of determining presence or absence of a damage of the wind turbine blade on the basis of the wavelength variation index calculated in the obtaining step.

In an optical fiber sensor having a diffraction grating part, the wavelength of the reflected light from the diffraction grating part can be effected by both of strain and temperature of the diffraction grating part. That is, the difference between the initial wavelength of the light allowed to enter the optical fiber sensor and the wavelength of the reflected light from the diffraction grating part may depend upon a strain caused in the diffraction grating part and also upon the temperature of the optical fiber. Here, an initial wavelength means a wavelength of a light in a state where no load is applied to the diffraction grating part and no strain is caused. A strain $\varepsilon_z$ caused in the diffraction grating part (i.e. a strain caused in a wind turbine blade) is represented by the following formula (A):

$$\varepsilon_\lambda = p \cdot (\lambda_o - \lambda_i) - \alpha \cdot \Delta T \qquad (A)$$

wherein in the formula (A), p represents a wavelength-strain conversion factor, $\lambda_o$ represents a wavelength of reflected light, $\lambda_i$ represents an initial wavelength, $\alpha$ represents a temperature coefficient, and $\Delta T$ represents a difference between a temperature of the optical fiber and a reference temperature (i.e. change in temperature). That is, the strain $\varepsilon_z$ is calculated by correcting the term of wavelength $\lambda_o$ with the term of temperature $\Delta T$.

From the above formula (A), $\varepsilon_{z1}-\varepsilon_{z2}$ which is amount of change between a strain $\varepsilon_{z1}$ at a time point $t_1$ and strain $\varepsilon_{z2}$ at a time point $t_2$ which is different from $t_1$, is represented by the following formula (B):

$$\varepsilon_{z1} - \varepsilon_{z2} = p \cdot (\lambda_{o1} - \lambda_{o2}) + \alpha \cdot (\Delta T_1 - \Delta T_2) \qquad (B)$$

The initial wavelength $\lambda_i$ is a fixed value, and if the change in temperature $\Delta T$ is substantially the same within the time period from $t_1$ until $t_2$, the second term on the right-hand side of the above formula (B) is zero. For example, in a short period of time such as a rotation period of a wind turbine rotor (usually 4 to 7 seconds), the temperature of the optical fiber can be regarded as being unchanged (i.e. $\Delta T_1 \approx \Delta T_2$). Therefore, in this case, the following equation (C) is satisfied:

$$\varepsilon_{z1} - \varepsilon_{z2} = p \cdot (\lambda_{o1} - \lambda_{o2}) \qquad (C)$$

As indicated by the formula (C), the amount of change in the strain depends upon the amount of change in wavelength of the reflected wave ($\lambda_{o1} - \lambda_{o2}$) but not upon the temperature of the optical fiber or the change in temperature. For example, in a case where there is a difference in the outside air temperature because of e.g. a difference in season, the magnitude of the strain $\varepsilon_z$ measured by the optical fiber sensor can be influenced by the change in temperature. For example, in a case where there is a difference in temperature of the optical fiber due to a difference in outside air temperature, even if the amount of strain is actually the same, there is a possibility that a difference occurs in the calculation result of $\varepsilon_z$ based on the formula (A) due to the accuracy of the temperature coefficient $\alpha$ or an individual variability of the optical fiber sensor. On the other hand, even if there is a difference in the outside air temperature around the optical fiber sensor, the amount of change in the strain $\varepsilon_{z1}$-$\varepsilon_{z2}$ will not be affected by the temperature, as is indicated by the formula (C).

According to the method of the above (1), since presence or absence of a damage of a wind turbine blade is determined on the basis of the wavelength variation index representing the amount of change in wavelength, it is possible to substantially eliminate an effect by temperature on the measurement value of the wavelength of the reflected wave by the optical fiber sensor (i.e. the measurement value of the strain). Therefore, it is possible to detect a damage with a good accuracy even under an environment where the temperature changes.

(2) In some embodiments, in the method of the above (1), in the obtaining step, a difference between a local maximum and a local minimum of the temporal change is calculated as the wavelength variation index.

The difference between the local maximum and the local minimum of the temporal change in the wavelength of the reflected light in the optical fiber sensor represents the magnitude of the change in wavelength of the reflected light during the term between the time when the wavelength of the reflected light becomes the local maximum and the time when the wavelength of the reflected light becomes the local minimum. Therefore, according to the method of the above (2), it is possible to detect a damage of the wind turbine blade by obtaining the difference between the local maximum and the local minimum of the wavelength of the reflected light as the wavelength variation index.

(3) In some embodiments, in the method of above (1), the difference between the local maximum and the local minimum which repeatedly alternately appear corresponding to a rotation period of the wind turbine rotor is calculated as the wavelength variation index.

As the azimuth angle of the wind turbine blade changes in accordance with the rotation of the wind turbine rotor, the altitude of the wind turbine also changes. Further, in general, the wind velocity becomes higher as the altitude becomes higher. Thus, during operation of the wind turbine, since wind load acting on the wind turbine blade varies periodically depending upon the wind velocity in accordance with the rotation of the wind turbine rotor, the strain in the wind turbine blade also changes periodically, and the wavelength of the reflected light in the optical fiber sensor, which represents the strain in the wind turbine blade, also changes periodically. According to the method of above (3), it is possible to more appropriately calculate the wavelength variation index to be used to determine a damage of the wind turbine blade on the basis of the local maximum and the local minimum which repeatedly alternately appear corresponding to a rotation period of the wind turbine rotor.

(4) In some embodiments, in the method of the above (2) or (3), in the obtaining step, determination of a second extremal value which is next to the first extremal value is suspended from a time point when a first extremal value appears until an end of a time period t which satisfies a relation of $0.1\,T \leq t \leq 0.5\,T$ where T is a rotation period of the wind turbine rotor.

Typically, the load acting on the wind turbine blade resulting from the wind is the largest when the wind turbine blade is at the uppermost part and is the smallest when the wind turbine blade is at the lowermost part. Thus, the local maximums and the local minimums of the wavelength of the reflected wave in accordance with the rotation of the wind turbine rotor appear every time period of about T/2 where T is the rotation period of the wind turbine rotor. However, besides these local maximums and local minimums according to the rotation of the wind turbine rotor, another local peak (local maximum or local minimum) may appear due to temporal variation in the wind velocity, for example. In order to appropriately recognize the local maximum and the local minimum according to the rotation of the wind turbine rotor from the temporal change in the wavelength of the reflected light of the optical fiber sensor, it is desirable to eliminate such local peak.

According to the method of the above (4), during a time period of a length of T/2, where one local maximum and one local minimum according to the rotation of the wind turbine rotor appear, from the time point when the first extremal value (a local maximum or local minimum) appears until the end of a prescribed length of time period t, determination of the second extremal value (a local minimum or local maximum) which is next to the first extremal value is suspended. It is thereby possible to more appropriately calculate the wavelength variation index, having eliminated a local peak (local maximum or local minimum) appearing within the period t.

(5) In some embodiments, in the method of the above (1), in the obtaining step, a standard deviation of the wavelength within a time period of a prescribed length is calculated as the wavelength variation index.

The standard deviation of the wavelength of the reflected light in the light fiber sensor within a time period of a prescribed length represents a magnitude of variation in the wavelength of the reflected light within the time period. Therefore, according to the method of the above (5), it is possible to detect a damage of the wind turbine blade by using, as the wavelength variation index, the standard deviation of the wavelength of the reflected light in the optical fiber sensor within such a time period.

(6) In some embodiments, in the method of any of the above (1) to (5), in the damage determination step, presence of the damage of the wind turbine blade is determined if a magnitude or change rate of the wavelength variation index falls outside a prescribed range.

The magnitude or the change rate of the wavelength variation index, which represents variation in the wavelength, changes corresponding to a magnitude of the strain or the change rate thereof. Further, the magnitude of the strain or the change rate thereof changes depending upon the degree of the progression of the damage caused in the wind turbine blade. Therefore, by preliminarily setting the prescribed range of the magnitude or the change rate of the wavelength variation index as in the method of the above (6), it is possible to detect a damage of the wind turbine blade.

(7) In some embodiments, in the method of any of the above (2) to (6), the method further comprises a time average calculation step of calculating an average of the wavelength variation index calculated in the obtaining step within a time period of not less than a rotation period of the wind turbine rotor, and in the damage determination step, presence of the damage of the wind turbine blade is determined on the basis of the average calculated in the time average calculation step.

In the method of the above (7), the average of the wavelength variation index within a prescribed time period of not less than a rotation period of the wind turbine rotor is used. Thus, by using an averaged wavelength variation index even if the wavelength variation index rapidly increases in a period shorter than the above time period (for example, in a case where the strain is suddenly increased due to e.g. by gust), it is possible to detect a damage of the wind turbine blade more appropriately.

(8) In some embodiments, in the method of the above (7), the method further comprises a data validity determination step of determining whether the wavelength variation index calculated in the obtaining step is a valid data or an invalid data, and in the time average calculation step, the average is calculated by using only the wavelength variation index determined as a valid data in the data validity determination step.

According to the method of the above (8), since the average is calculated by using only the wavelength variation index determined as a valid data which is suitable as the wavelength variation index, it is possible to detect the damage of the wind turbine blade more appropriately.

(9) In some embodiments, in the method of the above (8), in the data validity determination step, the wavelength variation index is determined as an invalid data if a value of the wavelength represents an abnormality of the optical fiber sensor or if the wavelength variation index calculated in the obtaining step is obtained from a difference between a local maximum of the wavelength and a local minimum greater than the local maximum.

The local maximum of the wavelength used for calculation of the wavelength variation index is usually larger than the local minimum of the wavelength used for the calculation of the wavelength variation index. However, it can be possible that the local minimum is larger than the local maximum due to an influence by a pitch control of the wind turbine blade or by a rapid change in the wind velocity.

In the method of the above (9), when a value of the wavelength to be used for calculation of the wavelength variation index is one indicating an abnormality of the optical fiber sensor, or, in a case where the local minimum is larger than the local maximum (that is, in a case where the calculation of the wavelength variation index is not completed normally), such wavelength variation index is determined as an invalid data. Therefore, since the average is calculated by using only the wavelength variation index which is a valid data calculated normally, it is possible to detect a damage of the wind turbine blade more appropriately.

(10) In some embodiments, in the method of any of the above (1) to (9), in the damage determination step, the damage of the wind turbine is determined by using, among the wavelength, only the wavelength obtained when a wind velocity falls within a prescribed range of wind velocity.

Since the load applied to the wind turbine blade depends on the wind velocity, the wave length of the reflected light detected in the light detection step and the wavelength variation index obtained in the obtaining step are varied in the values depending upon the wind velocity at the time of detection of the wavelength of the reflected light. According to the method of the above (10), a damage of the wind turbine blade is detected by using only the wavelength of the reflected light detected when the wind velocity falls within a prescribed range of wind velocity and the wavelength variation index based on such a wavelength, whereby it is possible to reduce the influence of the variation according to the wind velocity of the wavelength of the reflected light and the wavelength variation index and thereby to detect a damage of the wind turbine blade more appropriately.

(11) In some embodiments, in the method of any of the above (1) to (10), the wind turbine rotor has a plurality of wind turbine blades;

the method further comprises a difference calculation step of calculating a difference between the wavelength variation index of a detection target wind turbine blade among the plurality of the wind turbine blades and a reference value which reflects the wavelength variation index of at least one comparison target wind turbine blade among the other wind turbine blades; and in the damage determination step, a damage of the detection target wind turbine blade is determined on the basis of a temporal change in the difference calculated in the difference calculation step.

According to the method of the above (11), a difference between the wavelength variation index of a detection target wind turbine blade among the plurality of the wind turbine blades and a reference value which reflects the wavelength variation index of at least one comparison target wind turbine blade among the other wind turbine blades, is used to detect a damage of the wind turbine blade, whereby it is possible to eliminate the influence of operating condition such as the change of the wind velocity on the detection of a damage. Thus it is possible to detect abnormality due to the damage of the wind turbine blade more appropriately.

(12) In some embodiments, in the method of the above (11), the wind turbine rotor has at least three wind turbine blades;

the difference as to each of the wind turbine blades is calculated by repeating the difference calculation step by regarding the each of the wind turbine blades as the detection target wind turbine blade; and in the damage determination step, which wind turbine blade has the damage is determined on the basis of the difference as to each of the wind turbine blades.

If the damage is caused in any one of the wind turbine blade among the plurality of the wind turbine blades, the magnitude or the change rate of the difference is influenced depending upon whether the wind turbine blade is the detection target wind turbine blade. According to the method of the above (12), it is possible to determine the wind turbine blade having a damage on the basis of the magnitude of the difference or the change rate of the difference of the difference calculated repeatedly as to each wind turbine blade by regarding each of the wind turbine blades as the detection target wind turbine blade.

(13) A wind turbine according to at least one embodiment of the present invention comprises:

a wind turbine rotor having at least one wind turbine blade;

an optical fiber sensor being mounted on each of the wind turbine blade and having a diffraction grating part having a refractive index which is periodically varied in a longitudinal direction of the diffraction grating part;

a light incident part for allowing light to enter the optical fiber sensor;

a light detection part for detecting reflected light from the diffraction grating part; and a damage determination part for detecting a damage of the wind turbine blade; and the damage determination part is configured to obtain, from a temporal change of a wavelength of the reflected light detected by the light detection part, a wavelength variation index representing a variation amount of the wavelength, and to determine presence or absence of a damage of the wind turbine blade on the basis of the wavelength variation index.

In an optical fiber sensor having a diffraction grating part, the wavelength of the reflected light from the diffraction grating part can be effected by both of strain and temperature of the diffraction grating part. That is, the difference between the initial wavelength of the light allowed to enter the optical fiber sensor and the wavelength of the reflected light from the diffraction grating part may depend upon a strain caused in the diffraction grating part and also upon the temperature of the optical fiber. A strain $\varepsilon_z$ caused in the diffraction grating part (i.e. a strain caused in a wind turbine blade) is represented by the above formula.

From the above formula (A), $\varepsilon_{z1}$-$\varepsilon_{z2}$ which is amount of change between a strain $E_{z1}$ at a time point $t_1$ and strain $\varepsilon_{z2}$ at a time point $t_2$ which is different from $t_1$, is represented by the above formula (B). The initial wavelength $\lambda_i$ is a fixed value, and if the change in temperature $\Delta T$ is substantially the same within the time period from $t_1$ until $t_2$, the second term on the right-hand side of the above formula (B) is zero. Therefore, in this case, the above equation (C) is satisfied.

As indicated by the formula (C), the amount of change in the strain depends upon the amount of change in wavelength of the reflected wave ($\lambda_{o1}$-$\lambda_{o2}$) but not upon the temperature of the optical fiber or the change in temperature.

According to the configuration of the above (13), since presence or absence of a damage of a wind turbine blade is determined on the basis of the wavelength variation index representing the amount of change in wavelength, it is possible to substantially eliminate an effect by temperature on the measurement value of the wavelength of the reflected wave by the optical fiber sensor (i.e. the measurement value of the strain). Therefore, it is possible to detect a damage with a good accuracy even under an environment where the temperature changes.

(14) In some embodiments, in the configuration of the above (13), the damage determination part is configured to calculate, as the wavelength variation index, a difference between a local maximum and a local minimum of the temporal change.

The difference between the local maximum and the local minimum of the temporal change in the wavelength of the reflected light in the optical fiber sensor represents the magnitude of the change in wavelength of the reflected light during the term between the time when the wavelength of the reflected light becomes the local maximum and the time when the wavelength of the reflected light becomes the local minimum. Therefore, according to the configuration of the above (14), it is possible to detect a damage of the wind turbine blade by obtaining the difference between the local maximum and the local minimum of the wavelength of the reflected light as the wavelength variation index.

(15) In some embodiments, in the configuration of the above (13), the damage determination part is configured to calculate, as the wavelength variation index, a standard deviation of the wavelength within a time period of a prescribed length.

The standard deviation of the wavelength of the reflected light in the light fiber sensor within a time period of a prescribed length represents a magnitude of variation in the wavelength of the reflected light within the time period. Therefore, according to the configuration of the above (15), it is possible to detect a damage of the wind turbine blade by using, as the wavelength variation index, the standard deviation of the wavelength of the reflected light in the optical fiber sensor within such a time period.

According to at least one embodiment of the present invention, a method for detecting damage of a wind turbine blade with a good accuracy even under an environment where temperature changes, is provided.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1:
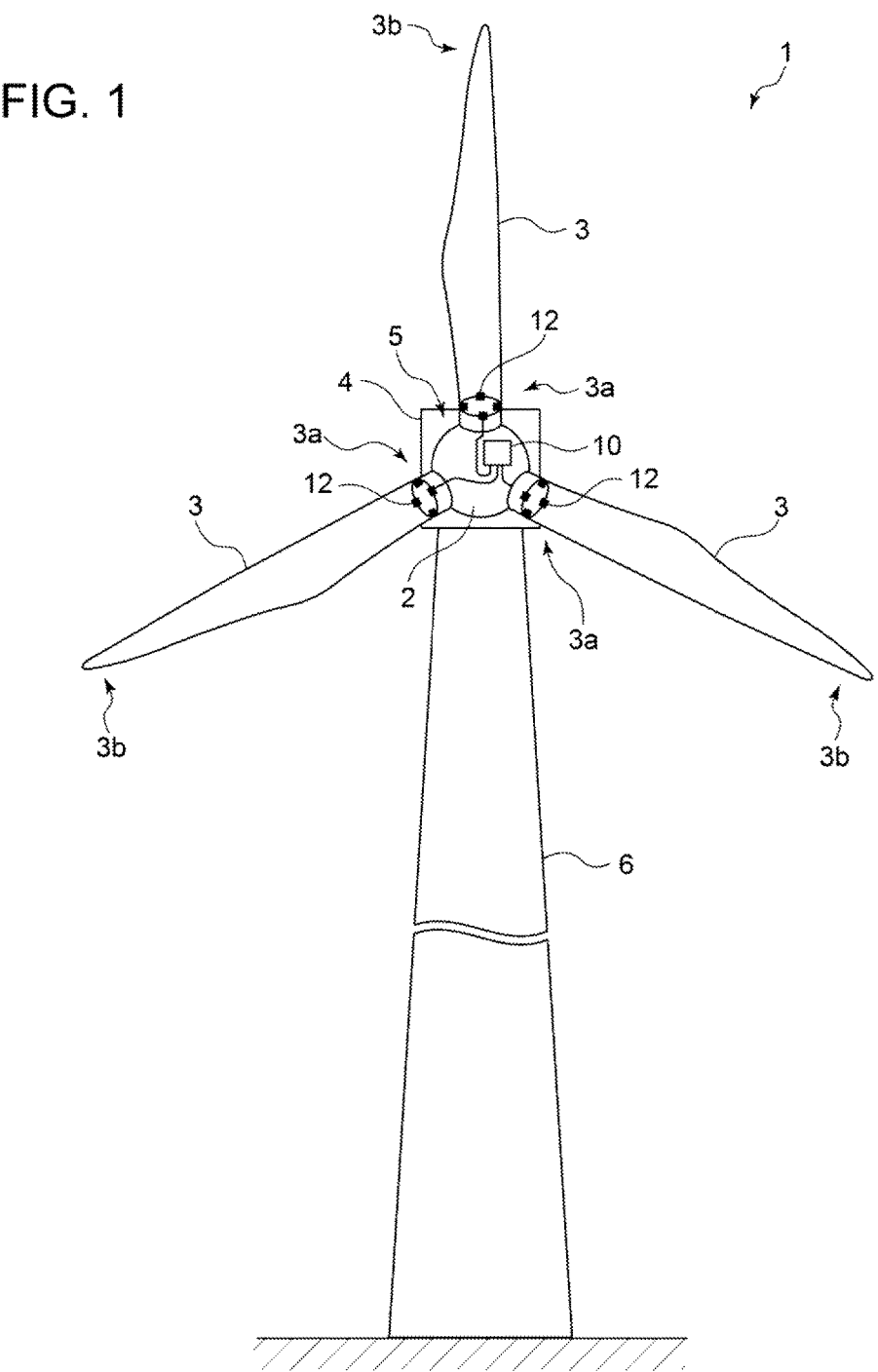
FIG. 1 is a schematic diagram illustrating a construction of a wind turbine according to an embodiment.

First, a configuration of a wind turbine having a wind turbine blade which is to be subjected to the detection of damage in an embodiment, will be described. FIG. 1 is a schematic diagram illustrating a construction of a wind turbine according to an embodiment. The wind turbine 1 comprises a wind turbine rotor 5 having at least one wind turbine blade 3 and a hub 2 to which the wind turbine blade is mounted. The wind turbine rotor 5 is provided in an upper portion of the tower 6 and is rotatably supported by a nacelle 4 supported by the tower 6. The wind turbine rotor 5 including the wind turbine blade 3 is configured to rotate when the wind turbine blade 3 receives wind.

In some embodiments, the wind turbine 1 may be a part of a wind turbine power generator. In this case, it may be that the nacelle 4 accommodates a generator (not shown) and a power transmitting mechanism (not shown) for transmitting rotation of the wind turbine rotor 5 to the generator. The wind turbine power generator is configured so that a rotation energy transmitted from the wind turbine rotor 5 via the power transmitting mechanism to the generator is converted into electric energy by the generator.

Figure 2:
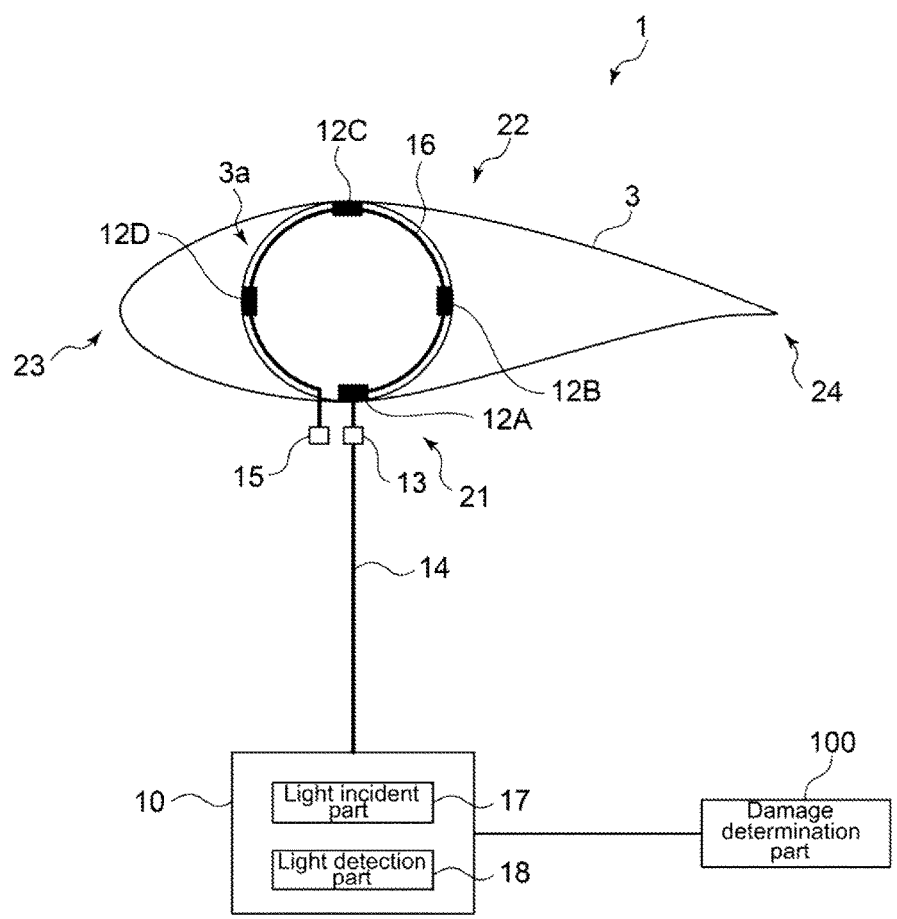
FIG. 2 is a diagram illustrating a cross-section of a wind turbine blade according to an embodiment, perpendicular to the longitudinal direction of the wind turbine blade.

FIG. 2 is a diagram illustrating a cross-section of a wind turbine blade according to an embodiment, perpendicular to the longitudinal direction of the wind turbine blade.

As illustrated in FIG. 1 and FIG. 2, the wind turbine 1 comprises an optical fiber sensors 12 (12A-12D) mounted on a blade root part 3a of each of the wind turbine blades 3, a light source/signal processing unit 10 including a light incident part 17 and a light detection part 18, and a damage determination part 100.

The optical fiber sensor 12 has a diffraction grating part having a refractive index which is periodically varied in the longitudinal direction of the diffraction grating part.

When a light having a broadband spectrum enters into the optical fiber sensor 12, interference occurs at reflection at the diffraction grating part having a periodically varied refractive index such that the intensity is increased only for a specific wavelength depending upon the grating interval (grating period). For this reason, the optical fiber sensor 12 reflects only a specific wavelength component and let the other wavelengths transmit.

If a strain applied to the optical fiber sensor 12 or the surrounding temperature changes, the refractive index or the grating interval of the diffraction grating part changes, and corresponding to such a change, the wavelength of the reflected light changes. The wavelength $\lambda_o$ of the reflected light is approximately represented by the following formula (A'):

$$\lambda_o - \lambda_i = (\varepsilon_z + \alpha \cdot \Delta T)/p \quad (A')$$

wherein $\varepsilon_z$ represents a strain of the optical fiber, $\lambda_o$ represents a wavelength of reflected light, $\lambda_i$ represents an initial wavelength, $\alpha$ represents a temperature coefficient, and $\Delta T$ represents a difference between a temperature of the optical fiber and a reference temperature (i.e. change in temperature), and p represents a wavelength-strain conversion factor. The temperature coefficient $\alpha$ is the sum of the thermal expansion coefficient $\alpha\Lambda$ and the thermo-optical coefficient $\alpha n$ (i.e. $\alpha = \alpha\Lambda + \alpha n$). $\alpha\Lambda$ represents a change of the grating period due to temperature change, and $\alpha n$ represents the change of the refractive index due to temperature change.

In this manner, the difference between the wavelength $\lambda_o$ of the reflected light in the optical fiber sensor 12 and the initial wavelength $\lambda_i$ can be influenced by the strain $\varepsilon_z$ of the optical fiber sensor 12 or the temperature $\Delta T$. Therefore, if the initial wavelength $\lambda_i$ is a prescribed value, ithe strain caused in the optical fiber sensor 12 or the temperature of the optical fiber can be determined by measuring the wavelength $\lambda_o$ of the reflected light.

In an embodiment, the optical fiber sensor 12 is a FBG (Fiber Bragg Grating) sensor.

On the blade root part 3a of each of the wind turbine blades 3, four optical fiber sensors 12 (12A-12D) are mounted. As illustrated in FIG. 2, the blade root part 3a of the wind turbine blade 3 has a substantially circular shape, and the optical fiber sensors 12A-12D are attached to the wall surface of the blade root part 3a each with an angular interval of 90°. In this embodiment, the four optical fiber sensors 12A, 12B, 12C and 12D are attached to the wall surface of the blade root part 3a at the pressure side (HP side) 21, the trailing edge side 24, the suction side (LP side) 22, and the leading edge side 23 in this order, respectively. When a strain is caused in the blade root part 3a, a strain corresponding to the strain at the place where each of the optical fiber sensors 12A-12D is mounted, is caused in the optical fiber sensors 12.

Further, these four optical fiber sensors 12A, 12B, 12C and 12D are connected in series in this order by an optical fiber cable 16. The optical fiber cable 16 has connectors (13, 15) provided on the both end parts, and an optical fiber cable 14 for connecting the optical fiber sensors 12A-12D and the light source/signal processing unit 10 and the optical fiber cable 16 connecting the optical fiber sensors 12A-12D in series are connected via the connector 13 or the connector 15.

In the embodiment shown in FIG. 2, four optical fiber sensors 12A-12D are provided for one wind turbine blade 3. However, it may be that at least one optical fiber sensor 12 is mounted on each of the wind turbine blades 3. In an embodiment, an optical fiber sensor 12 is mounted at least on the pressure side 21 (in FIG. 2, the place where the optical fiber sensor 12A is mounted). In an embodiment, optical fiber sensors 12 are mounted at least on the pressure side 21 and the suction side 22 (in FIG. 2, the place where the optical fiber sensor 12C is mounted) of the wind turbine blade 3.

In the above description, an example where the optical fiber sensor 12 is mounted on the blade root part 3a of the wind turbine blade 3 is described. However, the place where the optical fiber sensor 12 is mounted in the wind turbine blade 3 is not limited to the blade root part 3a. For example, the optical fiber sensor 12 may be mounted on the tip part 3b (see FIG. 1) of the wind turbine blade 3. Or a plurality of optical fiber sensors 12 may be attached to the wall surface of the tip part 3b at the pressure side (HP side), the trailing edge side, the suction side (LP side) and the leading edge side, respectively.

The optical fiber sensors 12 may be mounted on each of the blade root part 3a and the tip part 3b of the wind turbine blade 3.

In an embodiment, the light source/signal processing unit 10 including the light incident part 17 and the light detection part 18 is placed inside the hub 2.

The light incident part 17 is configured to allow light enter into the optical fiber sensors 12A-12D. The light incident part 17 has, for example, a light source capable of emitting light having a broad range of spectrum.

The light detection part 18 is configured to detect the reflected light from the diffraction grating part of each of the optical fiber sensors 12A-12D.

The light of a broadband emitted from the light incident part 17 propagates in the optical fiber cables (14, 16) and enters into the optical fiber sensors 12A-12D. In each of the optical fiber sensor 12A-12D, only a light having a specific wavelength corresponding to the strain and the temperature of each of the diffraction grating part is reflected at the diffraction grating part. The reflected light having reflected at the diffraction grating part propagates in the optical fiber cables (16, 14) and then is detected by the light detection part 18.

The optical fiber sensors 12A-12D are connected in series, and thus respective distances from the light incident part 17 to the optical fiber sensors 12A-12D, and respective distances from the optical fiber sensors 12A-12D to the light detection part 18, are different from one another. Thus, it is possible for the light detection part 18 to determine which optical fiber sensor 12 the detected light comes from on the basis of the elapsed time from emitting of the light by the light incident part 17 until detection of the reflected light from each of the optical fiber sensors 12A-12D by the light detection part 18A.

The wind turbine 1 comprises a damage determination part 100 for determining a damage of the wind turbine blade 3. The damage determination part 100 is configured to obtain, from a temporal change of the wavelength of the reflected light detected by the light detection part 18, a wavelength variation index representing the variation amount of the wavelength, and to determine presence or absence of a damage of the wind turbine blade on the basis of the wavelength variation index. That is, the damage determination part 100 is configured to detect a damage of the wind turbine blade 3 according to the method of the damage detection method as described below.

The damage of the wind turbine blade 3 may be a crack caused in the wind turbine blade 3, for example. If damage such as a crack is caused and undergoes progression in the wind turbine blade 3, an accident such as breakage of the wind turbine blade 3 may occur. Then, by appropriately performing damage detection of the wind turbine blade 3, it is possible to determine an appropriate timing of maintenance of the wind turbine blade 3, for example, thereby to perform operation of the wind turbine 1 safely.

Then, a method for detecting damage of the wind turbine blade 3 of the wind turbine 1 having the above described configuration, will be described.

Figure 3:
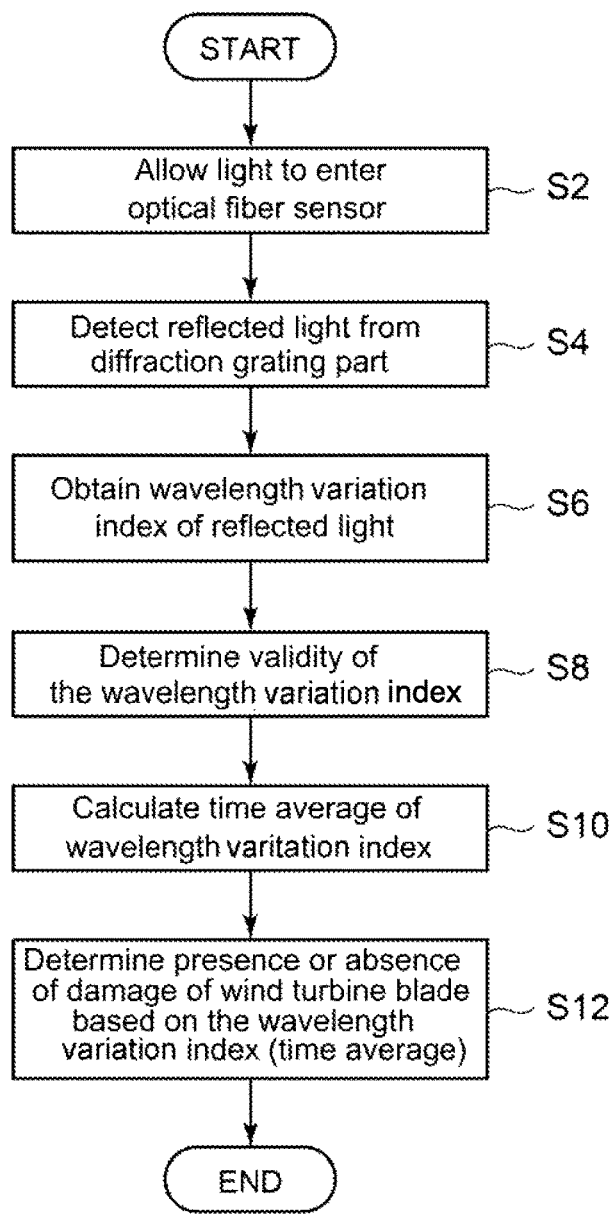
FIG. 3 is a flowchart showing a method for detecting a damage of a wind turbine blade according to an embodiment.

FIG. 3 is a flowchart showing a method for detecting a damage of a wind turbine blade according to an embodiment. In the method for detecting damage of the wind turbine blade 3 as shown in FIG. 3, first, a light is permitted to enter into the optical fiber sensors 12A-12D mounted on each of the wind turbine blades 3 (S2: light incident step), and the reflected light having reflected at the diffraction grating part of the optical fiber sensors 12A-12D is detected (S4: light detection step). Next, from the temporal change of the wavelength of the reflected light detected in the light detection step (S4), a wavelength variation index representing the variation amount of the wavelength of the reflected light is obtained (S6: obtaining step). Then, on the basis of the wavelength variation index calculated in the obtaining step (S6), presence or absence of damage of the wind turbine blade 3 is determined (S12: determination step).

In some embodiments, a time average of the wavelength variation index calculated in the obtaining step (S6) is calculated (S10: time average calculation step), and in the determination step (S12), damage of the wind turbine blades 3 is determined on the basis of the average value calculated in the time average calculation step.

In a method for detecting damage of the wind turbine blade 3 according to some embodiments, validity of the wavelength variation index calculated in the obtaining step (S6) is determined (S8: data validity determination step), and in the time average calculation step (S10), the average of the wavelength variation index is calculated using only the wavelength variation index determined as valid in the data validity determination step (S8).

These steps S2 to S12 will be now described.

Figure 4:
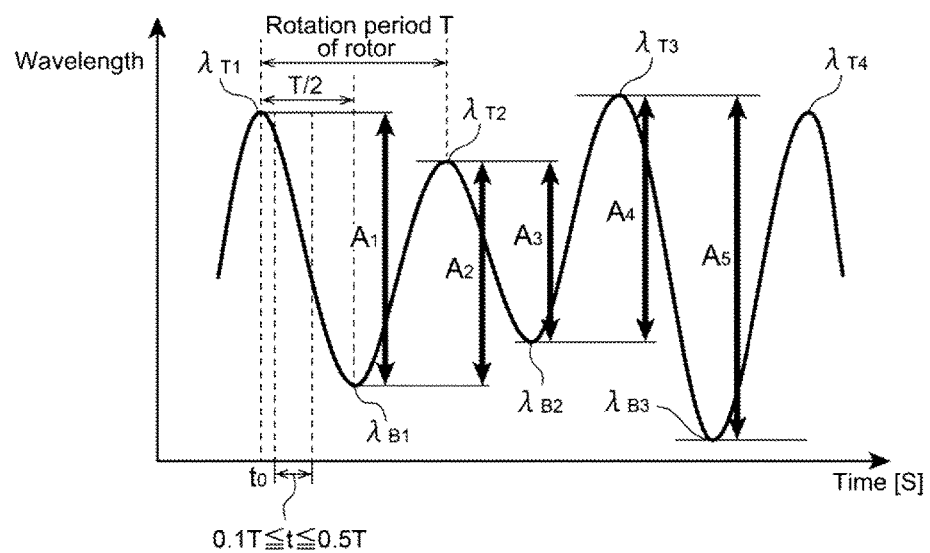
FIG. 4 is a graph showing an example of a temporal change in the wavelength of reflected light from the diffraction grating part in the method for detecting a damage of the wind turbine blade according to an embodiment.

FIG. 4 is a graph showing an example of the temporal change in the wavelength of reflected light from the diffraction grating part in the method for detecting a damage of the wind turbine blade according to an embodiment. In the light detection step (S4) of detecting the reflected light reflected at the diffraction grating part of the optical fiber sensors 12A-12D (in this specification, such reflected light will be also referred to simply as "reflected light"), a temporal change of the wavelength of the reflected light of FIG. 4, for example. In FIG. 4, $\lambda_{Tn}$ represents a local maximum of the wavelength of the reflected light, and $\lambda_{Bn}$ represents a local minimum of the wavelength of the reflected light. Further, $A_n$ in FIG. 3 represents a difference between a local maximum and a local minimum which are next to each other.

As indicated in the graph of FIG. 4, the wavelength of the reflected light varies with the time, repeating local maximums $\lambda_{Tn}$ and local minimums $\lambda_{Bn}$. Typically, the local maximums $\lambda_{Tn}$ and the local minimums $\lambda_{Bn}$ appear repeatedly alternately in accordance with the rotation period of the wind turbine rotor 5. This is mainly because of the following reason.

As the azimuth angle of the wind turbine blade 3 changes in accordance with the rotation of the wind turbine rotor 5, the altitude of the wind turbine blade 3 also changes. Further, in general, the wind velocity becomes higher as the altitude becomes higher. Thus, during operation of the wind turbine 1, since wind load acting on the wind turbine blade 3 varies periodically depending upon the wind velocity in accordance with the rotation of the wind turbine rotor 5, the strain in the wind turbine blade 3 also changes periodically, and the wavelength of the reflected light in the optical fiber sensor, which represents the strain in the wind turbine blade 3, also changes periodically. Accordingly, as described above, the local maximums $\lambda_{Tn}$ and the local minimums $\lambda_{Bn}$ appear repeatedly alternately in accordance with the rotation period of the wind turbine rotor 5. Further, the local maximums $\lambda_{Tn}$ and the local minimums $\lambda_{Bn}$ of the wavelength of the reflected wave in accordance with the rotation of the wind turbine rotor 5 appear every time period of about T/2 where T is the rotation period of the wind turbine rotor 5. That is, since usually, the wind load acting on the wind turbine blade 3 is the largest when the wind turbine blade 3 is at the uppermost part, the wavelength of the reflected light becomes a local maximum $\lambda_{Tn}$ at that time. Further, since usually, the wind load acting on the wind turbine blade 3 is the smallest when the wind turbine blade 3 is at the lowermost part, the wavelength of the reflected light becomes a local minimum $\lambda_{Tn}$ at that time.

Figure 9:
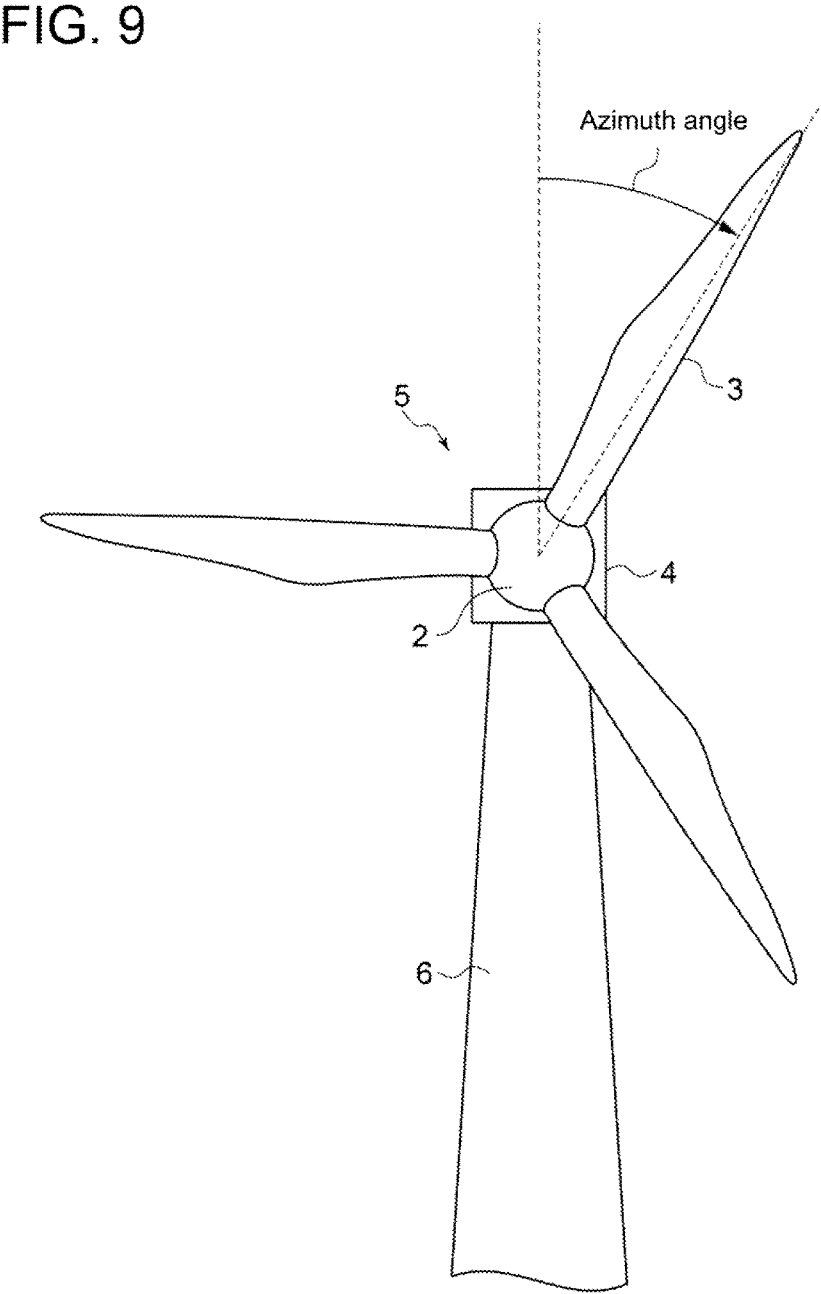
FIG. 9 is a diagram for explaining an azimuth angle of the wind turbine blade.

An azimuth angle is an angle between a prescribed reference direction and the axis line of the wind turbine blade 3 on the plan of rotation of the wind turbine blade 3. In this specification, the reference direction is the direction of the axis line of the wind turbine blade 3 when the wind turbine blade 3 is at the uppermost position. In this case, the azimuth angle when the wind turbine blade 3 is at the uppermost position of the wind turbine 1 is 0 degree, and the azimuth angle when the wind turbine blade 3 is lowermost position of the wind turbine 1 is 180 degrees. For reference, FIG. 9 is a diagram for explaining an azimuth angle of the wind turbine blade.

In an embodiment, in the obtaining step (S6), the difference between a local maximum and a local minimum which are next to each other in the temporal change of the reflected light is calculated as the wavelength variation index.

In FIG. 4, $A_n$ represents a difference between a local maximum and a local minimum. For example, $A_1$ is the difference ($|\lambda_{T1} - \lambda_{B1}|$) between the local maximums $\lambda_{T1}$ and the local minimums $\lambda_{B1}$, and $A_2$ is the difference ($|\lambda_{T2} - \lambda_{B1}|$) between the local maximums $\lambda_{T2}$ and the local minimums $\lambda_{B1}$. $A_3$ and the following can also be calculated in the same manner.

The difference $A_n$ between a local maximum and a local minimum as obtained in such a manner represents a magnitude of the variation of the wavelength of the reflected light within the time period between a time when the wavelength of the reflected light becomes a local maximum and a time when the wavelength of the reflected light becomes a local minimum. By determining presence or absence of damage of the wind turbine blade on the basis of the wavelength variation index $A_n$ representing the variation of the wavelength, it is possible to substantially eliminate influence due to temperature change on the measurement value (i.e. the measurement value of the strain) of the wavelength of the reflected wave by the optical fiber sensor. It is thereby possible to detect damage with a good accuracy even under an environment where temperature changes.

In the temporal change of the reflected light, besides the local maximums $\lambda_{Tn}$ and the local minimums $\lambda_{Bn}$ according to the rotation of the wind turbine rotor 5, another local peak (local maximum or local minimum) may appear due to temporal variation in the wind velocity, for example. Thus, in order to appropriately recognize the local maximums $\lambda_{Tn}$ and the local minimums $\lambda_{Bn}$ according to the rotation of the wind turbine rotor 5 from the temporal change in the wavelength of the reflected light obtained by the optical fiber sensors 12A-12D, it is desirable to eliminate such a local peak.

Thus, it may be that in the obtaining step (S6), determination of a second extremal value which is next to a first extremal value (e.g. $\lambda_{T1}$) is suspended from a time point $t_0$ when the first extremal value ($\lambda_{T1}$) appears until an end of a time period t which satisfies a relation of 0.1 T≤t≤0.5 T where T is a rotation period of the wind turbine rotor.

By suspending determination of the second extremal value (a local minimum or local maximum) which is next to the first extremal value during a time period of a length of T/2, where a local maximum $\lambda_{Tn}$ and a local minimum $\lambda_{Bn}$, according to the rotation of the wind turbine rotor 5 appear, from the time point $t_0$ when the first extremal value (a local maximum or local minimum) appears until the end of a prescribed length of time period t which satisfies a relation of 0.1 T≤t≤0.5 T, it is possible to more appropriately calculate the wavelength variation index, having eliminated a local peak (local maximum or local minimum) appearing within the period t.

In an embodiment, in the obtaining step (S6), a standard deviation of the wavelength of the reflected light within a time period $T_{SD}$ of a prescribed length is calculated as the wavelength variation index. The standard deviation σ of the wavelength of the reflected light with the period $T_{SD}$ can be calculated by the following formula (D):

$$\sigma = \frac{1}{N}\left\{\sum_{i=1}^{N}|\lambda_o - m|^2\right\}^{\frac{1}{2}} \quad (D)$$

wherein in the above formula (D), $\lambda_o$ is the wavelength of the reflected light, N is the number of data of $\lambda_o$ within the time period $T_{SD}$, m, represented by the following formula (E), is the average of $\lambda_o$ over the period $T_{SD}$:

$$m = \frac{1}{N}\sum_{i=1}^{N}\lambda_o \quad (E)$$

The standard deviation σ of the wavelength of the reflected light in the optical fiber sensor 12 within the time period $T_{SD}$ of a prescribed length represents the magnitude of variation of the wavelength of the reflected light within the term $T_{SD}$. Accordingly, damage of the wind turbine blade 3 can be detected by using the standard deviation σ of the wavelength of the reflected light in the optical fiber sensor 12 within the time period $T_{SD}$ as the wavelength variation index.

The length of the time period $T_{SD}$ of a prescribed length for calculating the standard deviation σ is not particularly limited.

In the data validity determination step (S8), whether the wavelength variation index calculated in the obtaining step (S6) is a valid data or an invalid data, is determined By calculating the average of the wavelength variation index in the time average calculation step (S10), which will be described later, using only the wavelength variation index determined as a valid data suitable as the wavelength variation index in this data validity determination step, it is possible to detect damage of the wind turbine blade 3 more appropriately.

In the data validity determination step (S8), it may be that a wavelength variation index calculated by using a wavelength value of reflected light indicating abnormality of the optical fiber sensor (i.e. a wavelength variation index calculated abnormally), is determined as an invalid data.

It may be that a wavelength variation index determined as not being an invalid data is determined as a valid data.

By calculating the average in the a time average calculation step (S10) by using only the wavelength variation index determined as the valid data calculated normally, it is possible to detect damage of the wind turbine blade 3 more appropriately.

An example of the wavelength variation index calculated by using a wavelength value of the reflected light indicating abnormality of the optical fiber sensor includes, for example, a wavelength variation index calculated when the data of wavelength of the reflected light detected by the light detection part 18 is not updated for at least a prescribed length of time due to e.g. failure of the optical fiber cable 14 (i.e. in the case of wavelength fixation). Another example may be a wavelength variation index calculated e.g. when the wavelength value of the reflected light detected by the light detection part 18 falls outside the wavelength range which is intrinsically measurable by the light detection part 18.

In the time average calculation step (S10), an average of the wavelength variation index calculated in the obtaining step (S6) within a time period $T_{AVE}$ of not less than a rotation period T of the wind turbine rotor, is calculate.

In order to evaluate a damage of the wind turbine blade 3, it is usually necessary to monitor the wind turbine blade 3 over a long period of time of e.g. weeks or months. By calculating the average of the wavelength variation index within the time period $T_{AVE}$ of a length depending on the purpose, it is possible to appropriately detect a damage of the wind turbine blade 3.

The time period $T_{AVE}$ for calculating the average of the wavelength variation index is not particularly limited, and it may be 10 minutes, for example.

In the time average calculation step (S10), the average may be calculated by using only the wavelength variation index determined as a valid data in the data validity determination step (S8).

In the damage determination step (S12), presence or absence of a damage of the wind turbine blade 3 is determined on the basis of the wavelength variation index calculated in the obtaining step (S8). By determining presence or absence of a damage of the wind turbine blade 3 on the basis of the wavelength variation index representing the variation of the wavelength, it is possible to substantially eliminate an influence due to temperature change on the measurement value (i.e. the measurement value of the strain) of the wavelength of the reflected light by the optical fiber sensors 12A-12D. Accordingly, it is possible to detect a damage with a good accuracy even under an environment where temperature changes.

In the damage determination step (S12), it may be that presence of a damage of the wind turbine blade 3 is determined if a magnitude or change rate of the wavelength variation index falls outside a prescribed range.

In the damage determination step (S12), it may be that a damage of the wind turbine blade 3 is determined by using, among the wavelength, only the wavelength obtained when a wind velocity falls within a prescribed range of wind velocity.

By determining a damage of the wind turbine blade 3 using only the wavelength of the reflected light detected when the wind velocity falls within a prescribed range of wind velocity and the wavelength variation index based on such a wavelength, it is possible to reduce the influence of the variation according to the wind velocity of the wavelength of the reflected light and the wavelength variation index and thereby to detect a damage of the wind turbine blade more appropriately.

In an embodiment, the prescribed range of wind velocity is a range of from 10 to 13 m/s.

Figure 5:
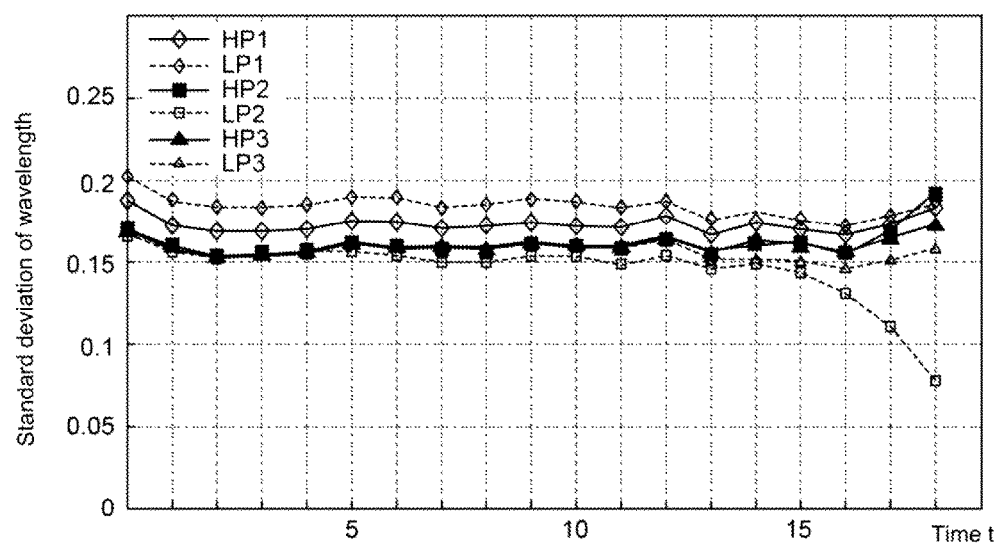
FIG. 5 is a graph showing a temporal change in the wavelength variation index in the method for detecting a damage of the wind turbine blade according to an embodiment.

FIG. 5 is a graph showing a temporal change in the wavelength variation index in the method for detecting a damage of the wind turbine blade according to an embodiment.

Specifically, the graph shows a temporal change of the wavelength variation index in a case where the steps S2 to S12 as shown in FIG. 3 are performed by using optical fiber sensors (12A, 12C) mounted on the pressure side (HP side) 21 and the suction side (LP side) of each of the wind turbine blade 3 in the wind turbine 1 having three wind turbine blade 3. In the obtaining step (S6), the standard deviation of the wavelength of the reflected light within a prescribed length of time is calculated as the wavelength variation index, and in the time average calculation step (S10), the average of the wavelength variation index (the standard deviation of the wavelength of the reflected light) over a period of one hour.

In the graph of FIG. 5, with respect to the wavelength of the reflected light obtained by the optical fiber sensors mounted on the pressure side (HP side) 21 and the suction side (LP side) 22 of each of three wind turbine blades 3 comprising a 1st blade, a 2nd blade and a 3rd blade, the average of the wavelength variation index (the standard deviation of the wavelength of the reflected light) over every one unit time calculated in the time average calculation step (S10), are plotted, with the horizontal axis representing time. In the FIG. 5, HPn and LPn (where n is an integer of from 1 to 3) represent standard deviations of the wave length of the reflected light detected by the optical fiber sensors mounted on the pressure side (HP side) 21 and on the suction side (LP side) 22 of the nth blade, respectively.

Figure 7:
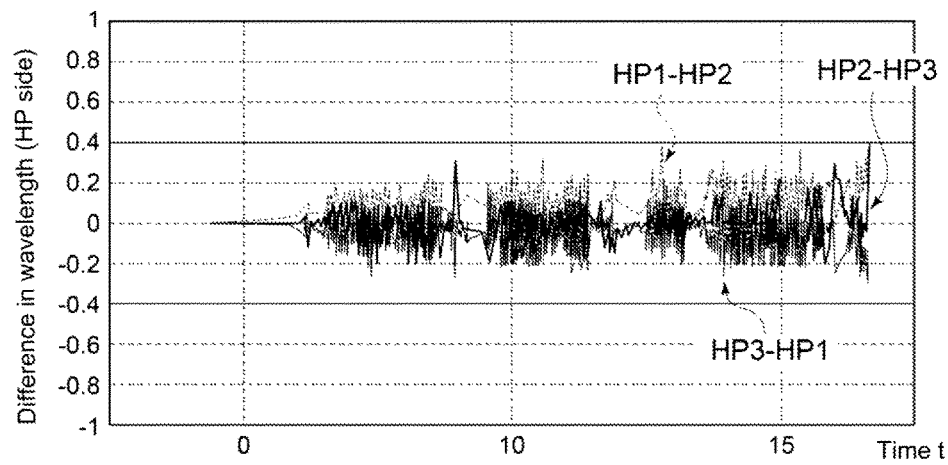
FIG. 7 is a graph showing a temporal change in the wavelength variation index in the method for detecting a damage of the wind turbine blade according to an embodiment.
Figure 8:
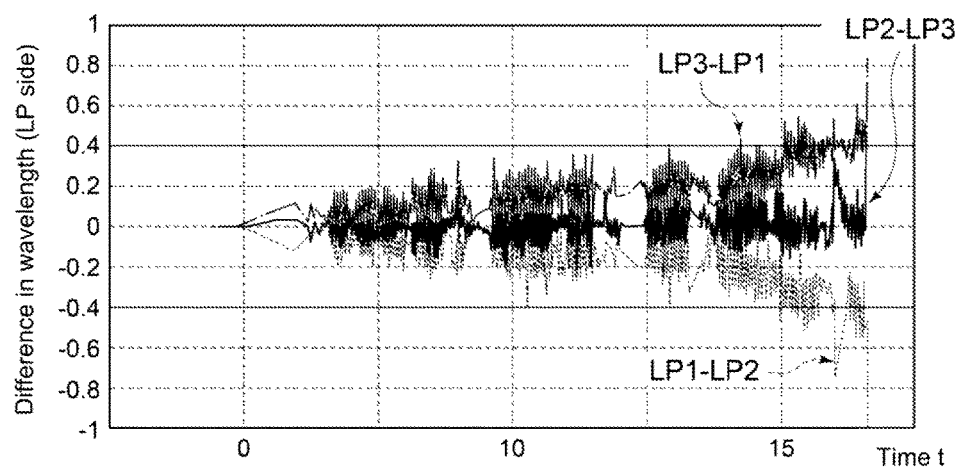
FIG. 8 is a graph showing a temporal change in the wavelength variation index in the method for detecting a damage of the wind turbine blade according to an embodiment.

In FIG. 5, FIG. 7 and FIG. 8, the horizontal axes are axes representing time. In this specification, for the sake of convenience, the unit of the time for explanation of the graphs is referred to as "unit time", which does not represent a specific unit of time such as day, month or year.

As indicated by FIG. 5, after the fifteenth unit time, the standard deviation (LP2) of the wavelength variation index as to the pressure side of the 2nd blade rapidly decreases as compared with the other wavelength variation indices.

From this result, by preliminarily setting a threshold value so that presence of damage in the wind turbine blade 3 is determined if the standard deviation of the wavelength variation index falls below 0.1, for example, it can be determined that a damage is caused in the 2nd blade in the eighteenth unit time.

Figure 6:
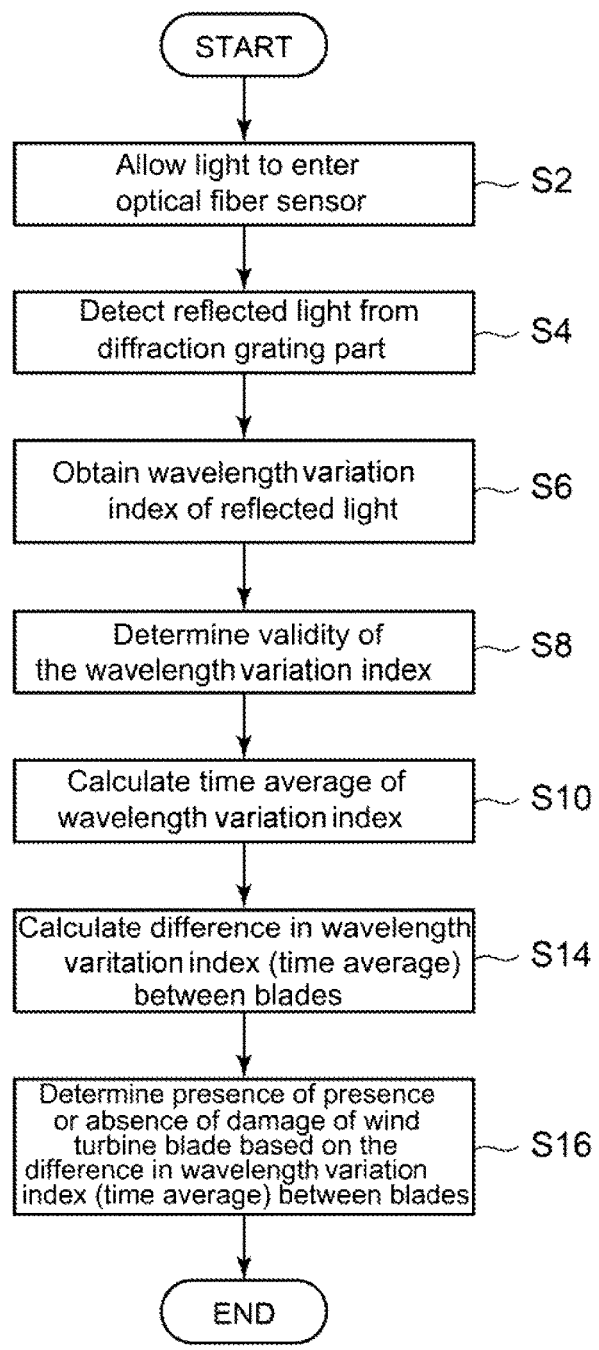
FIG. 6 is a flowchart showing a method for detecting a damage of a wind turbine blade according to an embodiment.

FIG. 6 is a flowchart showing a method for detecting a damage of a wind turbine blade according to an embodiment. The method for detecting a damage of the wind turbine blade 3 of the flowchart of FIG. 6 is for a wind turbine 1 comprising a plurality of the wind turbine blades 3.

In this damage detection method, the wavelength variation index is obtained in the above-described obtaining step (S6), and via the data validity determination step (S8), the average of the wavelength variation index is calculated in the time average calculation step (S10). Then the difference in the wavelength variation index between the wind turbine blades in the difference calculation step (S14), and in the determination step (S16), a damage of the wind turbine blade 3 is determined on the basis of the difference calculated in the difference calculation step (S14).

In an embodiment, in the difference calculation step (S14), a difference between the wavelength variation index (or the time average thereof) of one detection target wind turbine blade among the three wind turbine blades and a reference value which reflects the wavelength variation index (or the time average thereof) of one comparison target wind turbine blade among the other wind turbine blades, is calculated.

As the above reference value, the wavelength variation index (or the time average thereof) of one comparison target wind turbine blade among the other wind turbine blades 3 can be used. Or as the above reference value, an average of the wavelength variation index (or the time average thereof) of two or more comparison target wind turbine blades among the other wind turbine blades 3, or an average of the wavelength variation indices (or the time averages thereof) of two or more comparison target wind turbine blades among the other wind turbine blades 3 and one detection target wind turbine blade.

For example, in the difference calculation step (S14), in the wind turbine 1 having three wind turbine blades 3 comprising a 1st blade, a 2nd blade and a 3rd blade, a wavelength variation index $I_1$ of the 1st blade as the detection target wind turbine blade is calculated, and a wavelength variation index $I_2$ of the 2nd blade as the comparison target wind turbine blade is calculated. Then, the difference between these wavelength variation indices i.e. $I_1$-$I_2$ is calculated. In the same manner, the difference $I_2$-$I_3$ between the wavelength variation indices of the 2nd blade as the detection target wind turbine blade and the 3rd blade as the comparison target wind turbine blade is calculated, and the difference $I_3$-$I_1$ between the wavelength variation indices of the 3rd blade as the detection target wind turbine blade and the 1st blade as the comparison target wind turbine blade is calculated. In the damage determination step (S16), presence or absence of a damage of the wind turbine blades 3 is determined on the basis of the differences in wavelength variation index, i.e. $I_1$-$I_2$, $I_1$-$I_2$, and $I_1$-$I_2$, calculated in the difference calculation step (S14) as described above, and which wind turbine blade 3 has a damage is also determined on the basis of such differences in wavelength variation index, i.e. $I_1$-$I_2$, $I_1$-$I_2$.

Shown in each of FIG. 7 and FIG. 8 is a graph of an example of a temporal change in the wavelength variation index between a plurality of wind turbine blades obtained in the above-described difference calculation step (S14). Each of FIG. 7 and FIG. 8 is a graph showing a temporal change in the wavelength variation index in the method for detecting a damage of the wind turbine blade according to an embodiment. The graph of FIG. 7 shows a temporal change of the differences between the blades as to the time averages of the wavelength variation indices calculated from the wavelength of the reflected light obtained by each of the optical fiber sensor 12A mounted on the pressure side (HP side) 21 of each of the wind turbine blades 3 in the wind turbine 1 having three wind turbine blades 3 comprising a 1st blade, a 2nd blade and a 3rd blade. The graph of FIG. 8 shows a temporal change of the differences between the blades as to the time averages of the wavelength variation indices calculated from the wavelength of the reflected light obtained by each of the optical fiber sensor 12C mounted on the suction side (LP side) 22 of each of the wind turbine blades 3, in the same example as shown in FIG. 7. HPn and LPn (where n is an integer of from 1 to 3) in FIG. 7 and FIG. 8 represent time averages of the wavelength variation index as to the wavelengths of the reflected light by the optical fiber sensors mounted on the pressure side (HP side) 21 and the suction side (LP side) 22 of the nth blade, respectively. Further, HP1–HP2, for example, represents the time average of the wavelength variation index between the pressure side (HP side) 21 of the 1st blade and the pressure side (HP side) 21 of the 2nd blade.

In the graph of FIG. 7 showing the difference in the wavelength variation index calculated on the basis of the wavelength data of the reflected light at the pressure side (HP side) 21, all of the difference (HP1–HP2) between the 1st blade and the 2nd blade, the difference (HP2–HP3) between the 2nd blade and the 3rd blade, and the difference (HP3–HP1) between the 3rd blade and the 1st blade, fall within a certain range (for example a range of from −0.4 to 0.4) over the time period from the 0th unit time to the 15th unit time and later.

In contrast, in the graph of FIG. 8 showing the difference in the wavelength variation index calculated on the basis of the wavelength data of the reflected light at the suction side (LP side) 22, the difference (LP2–LP3) between the 2nd blade and the 3rd blade, falls within a certain range (for example a range of from −0.4 to 0.4) over the time period from the 0th unit time to the 15th unit time and later, while the difference (LP1–LP2) between the 1st blade and the 2nd blade, and the difference (LP3–LP1) between the 3rd blade and the 1st blade, rapidly increase in the absolute values around after the 13th unit time. From this, it can be determined that damage is caused and progressing in the 1st blade, which contributes to both of the difference (LP1–LP2) between the 1st blade and the 2nd blade and the difference (LP3–LP1) between the 3rd blade and the 1st blade.

Further, by preliminarily setting a threshold for the difference of the wavelength variation index (or the average thereof), it is possible to detect a damage from the temporal change of the difference and to specify the wind turbine blade 3 in which a damage is caused. For example, in the example as shown in FIG. 7 and FIG. 8, a threshold may be set so that a damage is determined to be caused in any of the wind turbine blades 3 when the absolute value of the difference of the average of the wavelength variation index exceeds 0.4.

Embodiments of the present invention were described in detail above, but the present invention is not limited thereto, and various amendments and modifications may be implemented within a scope that does not depart from the present invention.

In this specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

For instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The invention claimed is:

1. A method for detecting damage of a wind turbine blade of a wind turbine rotor having at least one wind turbine blade, comprising:
   a light incident step of allowing light to enter an optical fiber sensor being attached to each wind turbine blade and including a diffraction grating having a refractive index which is repetitively varied in a longitudinal direction of the diffraction grating;
   a light detection step of detecting reflected light from the diffraction grating;
   an obtaining step of obtaining, from a periodic temporal change of a wavelength of the reflected light received in the light detection step due to rotation of the wind turbine rotor, a wavelength variation index representing a temporal variation component of the wavelength in the periodic temporal change; and
   a damage determination step of determining presence or absence of a damage of the wind turbine blade on the basis of the wavelength variation index calculated in the obtaining step,
   wherein the wavelength variation index is a difference between a local maximum of the wavelength and a local minimum of the wavelength appearing in each rotation period of the wind turbine rotor.

2. The method for detecting damage of a wind turbine blade according to claim 1, wherein in the obtaining step, after a first extremal value that is one of the local maximum value or the local minimum value appears, determination of a second extremal value which is next to the first extremal value is suspended from a time point until an end of a time period t which satisfies a relation of $0.1\ T \leq t \leq 0.5\ T$ where T is the rotation period of the wind turbine rotor.

3. The method for detecting damage of a wind turbine blade according to claim 1, wherein in the obtaining step, a standard deviation of the wavelength within a time period of a prescribed length is calculated as the wavelength variation index.

4. The method for detecting damage of a wind turbine blade according to claim 1, wherein in the damage determination step, presence of the damage of the wind turbine blade is determined if a magnitude or change rate of the wavelength variation index falls outside a prescribed range.

5. The method for detecting damage of a wind turbine blade according to claim 1, further comprising:
   a time average calculation step of calculating an average of the wavelength variation index calculated in the obtaining step within a time period of not less than a rotation period of the wind turbine rotor, wherein in the damage determination step, presence of the damage of the wind turbine blade is determined on the basis of the average calculated in the time average calculation step.

6. The method for detecting damage of a wind turbine blade according to claim 5, further comprising:

a data validity determination step of determining whether the wavelength variation index calculated in the obtaining step is a valid data or an invalid data, wherein in the data validity determination step, the wavelength variation index is determined as an invalid data if a value of the wavelength represents an abnormality of the optical fiber sensor or if the wavelength variation index calculated in the obtaining step is obtained from a difference between a local maximum of the wavelength and a local minimum greater than the local maximum, and wherein in the time average calculation step, the average is calculated by using only the wavelength variation index determined as a valid data in the data validity determination step.

7. The method for detecting damage of a wind turbine blade according to claim 1, wherein in the damage determination step, the damage of the wind turbine is determined by using, among the wavelength, only the wavelength obtained when a wind velocity falls within a prescribed range of wind velocity.

8. The method for detecting damage of a wind turbine blade according to claim 1, wherein the wind turbine rotor has a plurality of wind turbine blades, wherein the method further comprises a difference calculation step of calculating a difference between the wavelength variation index of a detection target wind turbine blade among the plurality of the wind turbine blades and a reference value which reflects the wavelength variation index of at least one comparison target wind turbine blade among the other wind turbine blades, and wherein in the damage determination step, a damage of the detection target wind turbine blade is determined on the basis of a temporal change in the difference calculated in the difference calculation step.

9. The method for detecting damage of a wind turbine blade according to claim 8, wherein the wind turbine rotor has at least three wind turbine blades, wherein the difference as to each of the wind turbine blades is calculated by repeating the difference calculation step by regarding the each of the wind turbine blades as the detection target wind turbine blade, and wherein in the damage determination step, which wind turbine blade has the damage is determined on the basis of the difference as to each of the wind turbine blades.

10. A wind turbine comprising:

a wind turbine rotor having at least one wind turbine blade;

an optical fiber sensor being attached to each wind turbine blade and including a diffraction grating having a refractive index which is repetitively varied in a longitudinal direction of the diffraction grating;

a light source/signal processing unit connected to the optical fiber sensor and including: a light source for generating light which is input into the optical fiber sensor; and a light detector for detecting reflected light from the diffraction grating; and an index calculator for calculating, from a periodic temporal change of a wavelength of the reflected light detected by the light detector due to rotation of the wind turbine rotor, a difference between a local maximum of the wavelength and a local minimum of the wavelength appearing in each rotation period of the wind turbine rotor as a wavelength variation index representing a temporal variation component of the wavelength in the periodic temporal change, the wavelength variation index being used for determination of presence or absence of a damage of the wind turbine blade.

11. The wind turbine according to claim 10, wherein the index calculator is configured to calculate, as the wavelength variation index, a standard deviation of the wavelength within a time period of a prescribed length.

* * * * *